United States Patent [19]

MacDowell

[11] Patent Number: 5,023,207

[45] Date of Patent: Jun. 11, 1991

[54] SLAWSONITE-CONTAINING GLASS-CERAMICS

[75] Inventor: John F. MacDowell, Penn Yan, N.Y.

[73] Assignee: Corning Incorporated, Corning, N.Y.

[21] Appl. No.: 492,107

[22] Filed: Mar. 12, 1990

[51] Int. Cl.$^5$ .................... C03C 10/06; C03C 3/085; C03C 3/062

[52] U.S. Cl. .......................... 501/8; 501/69; 501/70; 501/73

[58] Field of Search .................. 501/8, 69, 70, 73

[56] References Cited

U.S. PATENT DOCUMENTS

| | | | |
|---|---|---|---|
| 3,236,662 | 2/1966 | MacDowell | 501/8 |
| 3,531,303 | 9/1970 | Bahet | 501/8 |
| 3,578,470 | 5/1971 | Bahet et al. | 501/8 |
| 4,360,567 | 11/1982 | Guillevic | 501/8 |
| 4,615,987 | 10/1986 | Chywng et al. | 501/8 |
| 4,634,683 | 1/1989 | Dumbaugh, Jr. | 501/32 |

*Primary Examiner*—Mark L. Bell
*Attorney, Agent, or Firm*—Clinton S. Janes, Jr.

[57] ABSTRACT

The present invention is directed to the preparation of glass-ceramic articles exhibiting an apparent annealing point of at least 1200° C. and containing slawsonite crystallization consisting essentially, in weight percent, of 10–54% SrO, 10–40% $Al_2O_3$, 36–55% $SiO_2$, and up to 25% total of at least one alkaline earth metal oxide in the indicated proportion of 0–10% MgO, 0–15% CaO, and 0–20% BaO.

1 Claim, No Drawings ns is melted;

SLAWSONITE-CONTAINING GLASS-CERAMICS

BACKGROUND OF THE INVENTION

Glass-ceramic articles have been marketed commercially for over three decades, the first of these being Corning's Code 9606 glass-ceramic radomes which were and still today are supplied by Corning Incorporated, Corning, N.Y. under the trademark PYROCERAM to United States missile manufacturers. Those radomes, containing cordierite as the predominant crystal phase, have a composition coming within the disclosure of U.S. Pat. No. 2,920,971, the basic patent in the field of glass-ceramics.

As is well-recognized in the art, glass-ceramics have customarily been prepared through the controlled crystallization of a precursor glass. Thus, glass-ceramic articles have been conventionally produced following the three general steps below: (a) a glass-forming batch containing a nucleation agent is melted; (b) that melt is cooled to a temperature at least below the transformation range and simultaneously a glass article of a desired configuration shaped therefrom; and (c) that glass article is heat treated in accordance with a predetermined schedule in order to controllably crystallize it in situ. Frequently, the heat treatment is carried out in two stages: (1) the glass is initially heated to a temperature somewhat above its transformation range to develop nuclei therein; and then (2) the nucleated glass is heated to a temperature approaching or even exceeding the softening point thereof to grow crystals on the nuclei. (As employed herein, the expression transformation range is defined as that temperature at which a melt is transformed into an amorphous solid, that temperature typically being deemed to reside in the vicinity of the annealing point of a glass.)

Because a glass-ceramic is derived from the in situ crystallization of a glass article, it is void-free and non-porous. Furthermore, because the customary glass-ceramic is more crystalline than glass, the chemical and physical properties exhibited thereby will be more reflective of the crystal phase(s) present therein than of the parent glass, and the residual glass remaining therein will have a different composition from the original glass, inasmuch as components constituting the crystal phase(s) will have been removed therefrom. To illustrate, the coefficient of thermal expansion and the refractoriness exhibited by a glass-ceramic are typically quite different from those demonstrated by the precursor glass.

As can be appreciated, the presence of a nucleating agent alters the properties which would be displayed where a desired crystal phase is present alone. For example, in some instances the nucleating agent is less refractory than the crystal phase generated, which circumstance diminishes the refractoriness of the glass-ceramic. In other instances, the nucleating agent may become part of the residual glass, thereby resulting in a higher level of glassy phase in the final product. In still other instances, the presence of a nucleating agent can lead to the generation of several crystal phases, thereby diluting the effect of a single desired crystal phase.

Therefore, in a rather recent modification of the basic process for manufacturing glass-ceramic bodies, the following procedure has been devised: First, a glass-forming batch is melted; Second, that melt is cooled to a temperature below the transformation range thereof and simultaneously a glass body of a desired configuration is shaped therefrom; Third, that glass shape is comminuted to a very fine powder (commonly called frit); Fourth, that frit is formed into a desired shape; and Fifth, that shape is heated to a temperature and for a time sufficient to sinter the particles into an integral, non-porous article which, utilizing surface nucleation of the very fine particles, will thereafter be crystallized in situ into a glass-ceramic.

As can be appreciated, articles of complex shapes can be prepared through a variety of conventional ceramic powder processing techniques such as dry pressing, drain casting, rolling, hot pressing, isostatic pressing, jiggering, slip casting, etc. The use of frits has also been found to be especially convenient in providing a glass-ceramic coating or film on a substrate.

SUMMARY OF THE INVENTION

The heart of the present invention resides in the discovery that certain compositions within the $SrO-Al_2O_3-SiO_2$ system can be formed into glass-ceramic products utilizing the powder processing, frit sintering, and crystallization procedure described immediately above, wherein the products contain slawsonite ($SrO \cdot Al_2O_3 \cdot 2SiO_2$) with, optionally, crystals of strontium silicate ($SrSiO_3$). Additions of other alkaline earth metal oxides may be included in the base composition to yield glass-ceramics not only containing slawsonite, but also such crystal phases as cordierite ($2MgO \cdot 2Al_2O_3 \cdot 5SiO_2$), anorthite ($CaO \cdot Al_2O_3 \cdot 2SiO_2$), and celsian or hexacelsian ($BaO \cdot Al_2O_3 \cdot 2SiO_2$).

Stated in the most general terms, the inventive articles can be produced in accordance with the steps below:

(a) a glass-forming batch of a predetermined composition is melted;

(b) the melt is cooled to a glass body (frequently the melt is poured as a stream into a water bath where it is fractured into fine particles, a practice in the glass art termed "drigaging");

(c) the glass body (particles) is comminuted to a very fine powder, i.e., commonly to an average diameter of less than 50 microns and, preferably, to an average diameter between about 5-15 microns;

(d) the glass powder is formed into a body of a desired configuration via conventional ceramic forming techniques;

(e) the body is sintered to essentially full density at temperatures between about 900°-1000° C.; and then (f) the sintered body is crystallized in situ at temperatures between about 1000°-1600° C., preferably between about 1200°-1400° C.

Whereas the sintering of the glass powder into a dense glass body can constitute a separate step and the resultant glass body examined for porosity and overall quality, the customary practice comprehends the sintering of the glass powder and the crystallization of the glass body as a continuous process. That is, the heat treatment schedule contemplates continuously heating the glass powder through the sintering temperature interval and into the crystallization range. Thus, Step (e), as a separate step, will normally be omitted inasmuch as the sintering process takes place relatively rapidly.

As is well-recognized in the glass-ceramic art, crystallization occurs more rapidly at higher temperatures. Hence, crystallization proceeds slowly at the cooler extreme of the effective temperature interval so practical economics dictates higher temperatures. Excessively high temperatures, however, can lead to coarse-grained crystallization and can hazard thermal deformation—thus, the preferred temperature range resides where good control of crystal growth can be had with rapid crystallization.

Furthermore, as is likewise well recognized in the glass-ceramic art, the crystal phases identified through X-ray diffraction analyses as slawsonite, cordierite, anorthite, etc. may not actually be the stoichiometric crystal, but also include solid solutions (s.s.) thereof. Hence, the diffraction pattern closely approximates the stoichiometric crystal but the elements of the pattern are slightly shifted. For example, barium or calcium may enter into the lattice of the slawsonite crystal.

I have found that slawsonite-containing glass-ceramic bodies can be prepared from precursor glass compositions consisting essentially, expressed in terms of weight percent on the oxide basis, of about 10–54% SrO, 10–40% $Al_2O_3$, and 36–55% $SiO_2$. Up to 25% total of the other alkaline earth metal oxides in the indicated proportions of 0–10% MgO, 0–15% CaO, and 0–20% BaO may optionally be included.

The products are highly crystalline, i.e., well over 50% by volume crystalline, and demonstrate short term resistance to temperatures up to 1600° C. and long term use temperatures up to 1200° C. and higher, high mechanical strength, and excellent chemical durability. In order to assure high refractoriness and excellent dielectric properties (high D.C. resistivity, low dissipation factor, and low dielectric constant), alkali metal oxides will be essentially absent from the composition.

Those properties commend the inventive glass-ceramics for use in the fabrication of radomes and, because of the low temperatures required for sintering into dense, integral bodies, they can also be useful in the preparation of dielectric substrates for electronic packaging and as matrices for the manufacture of ceramic whisker and/or fiber reinforced products.

Because the inventive compositions contain no nucleating agent, the growth and identity of the crystal phase(s) developed can be rigidly controlled. The inventive compositions must also be carefully formulated to satisfy a critical processing factor; viz., flow sufficient to densify the glass frit into an integral body is required before crystallization of the densified body to a glass-ceramic can be completed.

Prior Art

U.S. Pat. No. 1,920,971 (Stookey), noted earlier as the seminal patent in the field of glass-ceramics, supplies in excess of 100 working examples, one of which contained SrO, $Al_2O_3$, and $SiO_2$, but also containing 11.5% $TiO_2$. No mention is made of slawsonite or $SrSiO_3$ crystals and the high $TiO_2$ content reduces the refractoriness below that demonstrated by the articles of the present invention.

U.S. Pat. No. 3,467,534 (MacDowell) disclosed the preparation of glass-ceramic articles consisting essentially, in weight percent, of 20–70% BaO, 0–20% SrO, 0–3% $Al_2O_3$, and 30–80% $SiO_2$ wherein a barium silicate constitutes the primary crystal phase. No reference is made to slawsonite or strontium silicate crystals and the maximum concentration of $Al_2O_3$ optionally present is far below the minimum demanded in the instant inventive glass-ceramics.

U.S. Pat. No. 3,531,303 (Bahat) described the preparation of glass-ceramic articles consisting essentially, in weight percent, of 17–55% RO, wherein RO consists of 17–50% SrO and 20–50% BaO, 10–58% $Al_2O_3$, 12–53% $SiO_2$, and at least one nucleating agent selected from the group consisting of 0.2–2% $FeO+Fe_2O_3$, 0.2–2% ZnS, 0.25–2% $V_2O_5$, 0.1–4% $MoO_3$, 0.5–4% $CaF_2$, 2–10% $WO_3$, 0.1–2% NiO, 0.0008–1% Au, 0.0003–1% Pt, 0.008–1% Rh, 0.0008–1% Pd, and 0.02–1% Ir, wherein the crystals consist of at least one feldspar selected from the group of hexagonal alkaline earth feldspar and triclinic alkaline earth feldspar. No mention is made to slawsonite or strontium silicate crystals.

U.S. Pat. No. 3,578,470 (Bahat et al.) reported the preparation of glass-ceramic articles consisting essentially, in weight percent, of 10–30% BaO, 0–10% SrO, 5–30% $Al_2O_3$, 15–50% $SiO_2$, and 5–60% of a nucleating agent selected from the group of 0–50% $Nb_2O_5$ and 0–60% $Ta_2O_5$ wherein the principal crystal phase is hexacelsian. No reference is made to slawsonite or strontium silicate crystals. Moreover, whereas SrO can be tolerated in amounts up to 10%, its absence is preferred.

U.S. Pat. No. 4,360,567 (Guillevic) recorded the preparation of glass-ceramic articles consisting essentially, in weight percent, of 31–48% SrO, 24–35.7% $Al_2O_3$, and 28–35% $SiO_2$ where SrO-based crystals comprise the predominant crystal phase, the working examples containing crystals of $SrO \cdot Al_2O_3 \cdot 2SiO_2$ and $\beta$-$4SrO \cdot Al_2O_3$. The maximum level of $SiO_2$ is less than the minimum employed in the present inventive articles.

U.S. Pat. No. 4,634,683 (Dumbaugh, Jr.) was concerned with the preparation of crystal-containing glass articles consisting essentially, in mole percent, of 2–6% SrO, 18–26% $Al_2O_3$ and 68–80% $SiO_2$, those ranges being generally equivalent in terms of weight percent, of 3–10% SrO, 26–37% $Al_2O_3$, and 55–71% $SiO_2$. A SrO-containing crystal phase was not identified because of the extremely small size of the crystals; however, mullite ($3Al_2O_3 \cdot 2SiO_2$) was identified. The minimum amount of $SiO_2$ is greater than the maximum content thereof employed in the present inventive glass-ceramics.

DESCRIPTION OF PREFERRED EMBODIMENTS

Table I lists a group of glasses, expressed in terms of parts by weight on the oxide basis, illustrating compositions operable in the instant invention. However, because the sum of the individual components totals or closely approximates 100, for all practical purposes the tabulated values may be deemed to reflect weight percent. The actual batch ingredients therefor may comprise any materials, either oxides or other compounds, which, when melted together, will be converted into the desired oxide in the proper proportions. For example, $SrCO_3$, $MgCO_3$, and $CaCO_3$ comprised the batch materials for SrO, MgO, and CaO, respectively. Table IA reports the compositions of Table I in terms of mole ratio.

The batch ingredients were compounded, ballmilled together to assist in securing a homogeneous melt, and charged into platinum crucibles. The crucibles were moved into a furnace operating at about 1650°–1750° C. and the batches melted for 2–4 hours. Thereafter, the melts were poured as narrow streams into baths of tap water (drigaged) to be quenched into small glass particles. The particles were dried and milled to powders having an average diameter of about 5–15 microns.

Thereafter, the powders were dry pressed into sample shapes suitable for measuring such physical properties as density, linear coefficient of thermal expansion, and apparent annealing point.

The above description reflects laboratory melting and forming procedures only. It must be appreciated that the recorded compositions are capable of being melted in commercial large scale melting units and produced in large quantities.

TABLE I

|  | 1 | 2 | 3 | 4 | 5 | 6 |
|---|---|---|---|---|---|---|
| $SiO_2$ | 36.9 | 36.8 | 36.8 | 36.8 | 36.8 | 36.8 |
| $Al_2O_3$ | 31.3 | 27.8 | 26.8 | 25.0 | 23.5 | 20.9 |
| SrO | 31.8 | 35.3 | 36.3 | 38.1 | 39.7 | 42.4 |

|  | 7 | 8 | 9 | 10 | 11 | 12 |
|---|---|---|---|---|---|---|
| $SiO_2$ | 36.8 | 36.8 | 36.7 | 36.7 | 38.3 | 36.0 |
| $Al_2O_3$ | 17.9 | 15.6 | 12.5 | 10.4 | 32.5 | 30.0 |
| SrO | 45.4 | 47.6 | 50.8 | 52.9 | 24.8 | 23.0 |
| CaO | — | — | — | — | 4.5 | — |
| BaO | — | — | — | — | — | 11.0 |

|  | 13 | 14 | 15 | 16 | 17 | 18 |
|---|---|---|---|---|---|---|
| $SiO_2$ | 38.7 | 41.3 | 37.5 | 43.1 | 39.8 | 43.7 |
| $Al_2O_3$ | 32.9 | 32.4 | 35.1 | 31.4 | 33.8 | 33.0 |
| SrO | 22.3 | 22.0 | 21.6 | 21.3 | 17.2 | 16.8 |
| CaO | 6.0 | — | 5.8 | — | 9.3 | — |
| MgO | — | 4.3 | — | 4.1 | — | 6.5 |

|  | 19 | 20 | 21 | 22 | 23 |
|---|---|---|---|---|---|
| $SiO_2$ | 42.3 | 46.3 | 46.1 | 42.8 | 47.9 |
| $Al_2O_3$ | 35.2 | 31.5 | 33.6 | 37.0 | 32.5 |
| SrO | 16.2 | 16.0 | 11.4 | 11.4 | 11.0 |
| MgO | 6.3 | 6.2 | 8.9 | 8.8 | 8.6 |

TABLE IA

|  | 1 | 2 | 3 | 4 | 5 | 6 |
|---|---|---|---|---|---|---|
| $SiO_2$ | 2 | 9 | 7 | 5 | 4 | 3 |
| $Al_2O_3$ | 1 | 4 | 3 | 2 | 1.5 | 1 |
| SrO | 1 | 5 | 4 | 3 | 2.5 | 2 |

|  | 7 | 8 | 9 | 10 | 11 | 12 |
|---|---|---|---|---|---|---|
| $SiO_2$ | 3.5 | 4 | 5 | 6 | 2 | 2 |
| $Al_2O_3$ | 1 | 1 | 1 | 1 | 1 | 1 |
| SrO | 2.5 | 3 | 4 | 5 | 0.75 | 0.75 |
| CaO | — | — | — | — | 0.25 | — |
| BaO | — | — | — | — | — | 0.25 |

|  | 13 | 14 | 15 | 16 | 17 | 18 |
|---|---|---|---|---|---|---|
| $SiO_2$ | 6 | 6.5 | 6 | 7 | 4 | 4.5 |
| $Al_2O_3$ | 3 | 3 | 3.3 | 3 | 2 | 2 |
| SrO | 2 | 2 | 2 | 2 | 1 | 1 |
| CaO | 1 | — | 1 | — | 1 | 1 |
| MgO | — | 1 | — | 1 | — | — |

|  | 19 | 20 | 21 | 22 | 23 |
|---|---|---|---|---|---|
| $SiO_2$ | 4.5 | 5 | 7 | 6.5 | 7.5 |
| $Al_2O_3$ | 2.2 | 2 | 3 | 3.3 | 3 |
| SrO | 1 | 1 | 1 | 1 | 1 |
| MgO | 1 | 1 | 2 | 2 | 2 |

The samples were moved into an electrically-heated furnace and subjected to the heat treatments recorded in Table II. The samples fired to high density glass articles at temperatures of about 1000° C. and crystallized in situ at temperatures of between 1000°–1600° C.

The time required to achieve virtually complete crystallization is, as would be expected, a function of the temperature employed; hence, a longer time will be required at the lower extreme of the crystallization range. For example, whereas exposure periods as brief as 0.5 hour may be sufficient at 1500° C., times greater than eight hours may be necessary at 1000° C.

The use of specific hold times within the crystallization temperature interval is simply a matter of convenience. It is only necessary that the glass powder compact remain within the crystallization range for a sufficient length of time to develop the desired degree of crystallization. The temperature can be continuously moving within the range.

In Table II the heating range designated FR denotes heating at the fastest rate of which the furnace is capable, that rate generally averaging about 100° C./minute. At the conclusion of the crystallization dwell period, the electric current to the furnace was cut off and the furnace allowed to cool to room temperature with the samples retained therewithin. This latter practice is termed "cooling at furnace rate" and averages about 2°–10° C./minute.

Table II also records a visual description of the appearance of the glass-ceramic, the crystal phase(s) present as identified through X-ray diffractometry, and, where measured, the density (Dens.) of the glass-ceramic expressed in terms of $g/cm^3$, the linear coefficient of thermal expansion (Exp.) of the glass-ceramic over the range 25°–300° C. expressed in terms of $\times 10^{-7}/°C.$, and the apparent annealing point, i.e., the temperature at which the glass-ceramic demonstrates a viscosity of $10^{13}$ poises, expressed in terms of °C. Temperatures below that value are presumed to be suitable for long term use without substantial physical deformation.

TABLE II

| Ex. | Heat Treatment | Description | Crystal Phases | Dens. | Exp. | $10^{13}$ |
|---|---|---|---|---|---|---|
| 1 | FR to 1500-0.5 hr. | Dense, gray, non-porous | Slawsonite | — | 35 | — |
| 2 | 300/hr to 1100 no hold 200/hr to 1300-1 hr | Dense, white, non-porous | Slawsonite, $SrO.SiO_2$ | 2.975 | 42.7 | — |
| 3 | 300/hr to 1100 no hold 200/hr to 1300-1 hr | Dense, white, non-porous | Slawsonite, $SrO.SiO_2$ | 3.006 | 42.6 | — |
| 4 | 300/hr to 1100 no hold 200/hr to 1300-1 hr | Dense, white, non-porous | Slawsonite, $SrO.SiO_2$ | 3.082 | 45.0 | — |
| 5 | 300/hr to 1100 no hold 200/hr to 1300-1 hr | Dense, white, non-porous | Slawsonite, $SrO.SiO_2$ | — | 47.8 | — |

TABLE II-continued

| Ex. | Heat Treatment | Description | Crystal Phases | Dens. | Exp. | $10^{13}$ |
|---|---|---|---|---|---|---|
| 6 | 300/hr to 1100 no hold 200/hr to 1300-1 hr | Dense, white, non-porous | Slawsonite, $SrO.SiO_2$ | 3.143 | 56.4 | — |
| 7 | 300/hr to 1100 no hold 200/hr to 1300-1 hr | Dense, white, non-porous | Slawsonite, $SrO.SiO_2$ | — | 62.4 | — |
| 8 | 300/hr to 1100 no hold 200/hr to 1300-1 hr | Dense, white, slight sag | Slawsonite, $SrO.SiO_2$ | 3.226 | 67.5 | — |
| 9 | 300/hr to 1100 no hold 200/hr to 1300-1 hr | Dense, white, rounded | Slawsonite, $SrO.SiO_2$ | 3.265 | 73.1 | — |
| 10 | 300/hr to 1100 no hold 200/hr to 1300-1 hr | Dense, white, slight round | Slawsonite, $SrO.SiO_2$ | 3.275 | 78.4 | — |
| 11 | FR to 1500-0.5 hr | Dense, gray, non-porous | Slawsonite, anorthite | — | 36.6 | — |
| 12 | FR to 1500-0.5 hr | Dense, light, gray, non-porous | Slawsonite s.s | — | 35.0 | — |
| 13 | 300/hr to 1100 200/hr to 1400-1 hr | Dense, white | Slawsonite, anorthite | 2.837 | 37.8 | 1203 |
| 14 | 300/hr to 1100 200/hr to 1400-1 hr | Dense, white | Slawsonite, cordierite | 2.819 | 25.7 | 1288 |
| 15 | 300/hr to 1100 200/hr to 1400-1 hr | Dense, white | Slawsonite, anorthite | 2.814 | — | 1391 |
| 16 | 300/hr to 1100 200/hr to 1400-1 hr | Dense, white | Slawsonite, cordierite | 2.750 | 28.9 | 1286 |
| 17 | 300/hr to 1100 200/hr to 1400-1 hr | Dense, white | Slawsonite, anorthite | 2.785 | 37.9 | 1206 |
| 18 | 300/hr to 1100 200/hr to 1400-1 hr | Dense, white | Slawsonite, cordierite | 2.710 | 19.7 | 1327 |
| 19 | 300/hr to 1100 200/hr to 1400-1 hr | Dense, white | Slawsonite, cordierite | 2.737 | — | 1330 |
| 20 | 300/hr to 1100 200/hr to 1400-1 hr | Dense, white | Slawsonite, cordierite | — | — | 1292 |
| 21 | 300/hr to 1100 200/hr to 1400-1 hr | Dense, white, translucent | Slawsonite, cordierite | 2.680 | 15.7 | 1318 |
| 22 | 300/hr to 1100 200/hr to 1400-1 hr | Dense, white | Slawsonite, cordierite | 2.696 | — | 1330 |
| 23 | 300/hr to 1100 200/hr to 1400-1 hr | Dense, white | Slawsonite, cordierite | 2.531 | — | 1308 |

Based upon an overall combination of properties, the preferred compositions consist essentially, expressed in terms of weight percent on the oxide basis, of 15–40% SrO, 25–37% $Al_2O_3$, and 37–45% $SiO_2$.

The most preferred embodiments of the inventive compositions consist of Examples 15 and 19.

I claim:

1. A glass-ceramic article exhibiting an apparent annealing point of at least 1200° C. and containing slawsonite crystals with, optionally, strontium silicate crystals as essentially the sole crystal phase(s) consisting, expressed in terms of weight percent on the oxide basis, of 15–40% SrO, 25–37% $Al_2O_3$, and 37–45% $SiO_2$.

* * * * *